United States Patent
Kuechenthal et al.

(10) Patent No.: US 12,026,568 B2
(45) Date of Patent: Jul. 2, 2024

(54) RFID LABEL

(71) Applicant: Merck Patent GmbH, Darmstadt (DE)

(72) Inventors: Christian-Hubertus Kuechenthal, Darmstadt (DE); Roja Azees, Darmstadt (DE); Dan Kvelstad, Darmstadt (DE); Sven Erfurth, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 17/777,637

(22) PCT Filed: Nov. 18, 2020

(86) PCT No.: PCT/EP2020/082479
§ 371 (c)(1),
(2) Date: May 18, 2022

(87) PCT Pub. No.: WO2021/099353
PCT Pub. Date: May 27, 2021

(65) Prior Publication Data
US 2023/0004771 A1    Jan. 5, 2023

(30) Foreign Application Priority Data

Nov. 21, 2019  (EP) .................................... 19210659

(51) Int. Cl.
*G06K 19/07*    (2006.01)
*G06K 19/073*    (2006.01)

(52) U.S. Cl.
CPC ... *G06K 19/0723* (2013.01); *G06K 19/07372* (2013.01)

(58) Field of Classification Search
CPC ......... G06K 19/0723; G06K 19/07722; G06K 19/0776

(Continued)

(56) References Cited

U.S. PATENT DOCUMENTS

2007/0063057 A1    3/2007    Masubuchi et al.
2015/0090625 A1*   4/2015    Bauss .................. B65D 23/085
                                                        206/459.5

(Continued)

FOREIGN PATENT DOCUMENTS

EP      3330896 A1      6/2018
JP      2005-122352 A   5/2005

(Continued)

OTHER PUBLICATIONS

International Search Report dated Feb. 9, 2021 issued in corresponding PCT/EP2020/082479 application (4 pages).

*Primary Examiner* — Ahshik Kim
(74) *Attorney, Agent, or Firm* — MILLEN, WHITE, ZELANO & BRANIGAN, P.C.; Csaba Henter

(57) ABSTRACT

The invention concerns a RFID label for marking containers or equipment, preferably in a laboratory environment and including in particular cylindrical bottles, vials, syringes, etc., by adhering the RFID layer to a surface thereof. The RFID label has a flat flexible support material base (11), at least one RFID microelectronic device (5c) included in the flat support material base (11), and at least one antenna (5a,5b) connected with the at least one RFID microelectronic device (5c) and included in the flat support material base (11). The flat support material base (11) has a number of predefined cuts (8) distributed about its outer periphery and/or the at least one RFID microelectronic device (5c) includes a tamper detection function and a conductive loop (5d) connected with tamper detection function terminals of the RFID microelectronic device (5c) is included in the flat support material base (11).

16 Claims, 5 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2019/0065926 A1* | 2/2019 | Waidmann | G06K 19/07707 |
| 2019/0135501 A1 | 5/2019 | Chandra et al. | |
| 2020/0160004 A1* | 5/2020 | Yamamoto | G06K 7/10366 |
| 2020/0202192 A1* | 6/2020 | Hu | G06K 19/06028 |
| 2021/0049437 A1* | 2/2021 | Virtanen | G06K 19/07786 |

FOREIGN PATENT DOCUMENTS

| | | | |
|---|---|---|---|
| JP | 2010-128517 A | 6/2010 | |
| WO | 02/077939 A1 | 10/2002 | |
| WO | 2017184603 A1 | 10/2017 | |

* cited by examiner

RFID LABEL

The invention concerns a RFID label for marking containers or equipment, preferably in a laboratory environment and including in particular cylindrical bottles, vials, syringes, etc., by adhering the RFID layer to a surface thereof.

In general, RFID Labels are available on the market. Different types of labels are needed for use in various areas. In addition, the frequency ranges for the communication with external devices differ according to the countries to read the RFID labels. It might happen, for example, that it will not be possible to use a RFID Label in Europe and the US. Using dual frequency ranges for NFC and UHF in a label is highly limited. Only labels with large dimensions are available in the market with diverse performance and depending on the size with very low reading ranges.

In addition, tamper detection, flexibility to use on any surfaces of different containers encountered in the laboratory field, in particular such containers of different size/volume that have cylindrical outer surfaces like bottles, vials, syringes, etc., with different curvature, or chemical resistance combined into one RFID labels are not available in the market.

It is thus an object of the invention to provide a RFID label that solves at least some of the problems mentioned above.

The RFID label in particular is to meet one or more of the following requirements:
  global usability;
  extended reading range on glass with limited dimensions;
  high temperature range of use;
  sufficient flexibility to stick on different containers with varying sizes;
  chemical resistance against common solvents and cleaning substances in the laboratory environment (e.g. acetone, acetonitrile, ethanol, isopropanol);
  tamper detection, preferably for one time usability.

To meet one or more of these requirements the invention provides a RFID label with the features of claim 1 or 2. Preferred embodiments are defined in the dependent claims.

The invention in particular provides, in a first solution, a RFID label for marking containers, preferably bottles, vials, syringes, etc., or equipment by adhering the RFID layer to a surface thereof, the label comprising a flat flexible support material base, at least one RFID microelectronic device included in the flat support material base, and at least one antenna connected with the at least one RFID microelectronic device and included in the flat support material base, wherein the flat support material base has a number of predefined cuts distributed about its outer periphery.

The invention in particular provides, in a second solution, a RFID label for marking containers or equipment by adhering the RFID layer to a surface thereof, the label comprising a flat flexible support material base, at least one RFID microelectronic device included in the flat support material base, and at least one antenna connected with the at least one RFID microelectronic device and included in the flat support material base, wherein the at least one RFID microelectronic device includes a tamper detection function and a conductive loop connected with tamper detection function terminals of the RFID microelectronic device is included in the flat support material base.

Preferably, the flat flexible support material base includes an elongated extension strip integrally formed with the support material base so as to extend therefrom and configured to be at least partly separated from the support material base at a predefined separation structure, preferably in the form of a predefined tearing line.

Preferably, in particular in the second solution, the conductive loop extends over the predefined separation structure, preferably the tearing line, which tearing line is preferably unsymmetrical to define a preferred start of tearing.

Preferably, in particular in the second solution, the flat support material base has a number of predefined cuts as in the first solution which are distributed about its outer periphery.

Preferably, the cuts are substantially straight cuts that are oriented so as to be inclined with respect to an outer edge of the flat support material base in a top view.

Preferably, the cuts are oriented substantially towards a central portion of the flat support material base in the top view.

Preferably, the cuts extend over a length between 3% and 10% of the length of an outer edge of the flat support material base at which they are provided or in the direction of which they extend.

Preferably, the cuts are spaced from each other along the outer edge by a length between 5% and 30% of the length of the outer edge of the flat support material base at which they are provided or in the direction of which they extend.

Preferably, the flat support material base is substantially rectangular in a top view.

Preferably, the antenna and, if provided, the conductive loop is/are printed on a surface of a plastic or paper-based material or are formed from a metal layer.

Preferably, the flat support material base has a PP synthetic top surface layer laminated on the printed plastic or paper-based material or the metal layer.

Preferably, the flat support material base has an adhesive bottom layer applied to the bottom surface.

Preferably, the RFID microelectronic device is configured to communicate with two different frequency ranges, preferably UHF and NFC, and a second antenna connected with the RFID microelectronic device is included in the flat support material base.

Preferably, one of the antennas is arranged between sections of the other antenna or is nested within the other antenna.

The invention additionally provides a container, including in particular cylindrical bottles, vials, syringes, etc, with a RFID label as described on a surface thereof.

The invention will now be described by reference to the attached drawing showing two different embodiments as an example.

Figure 1:
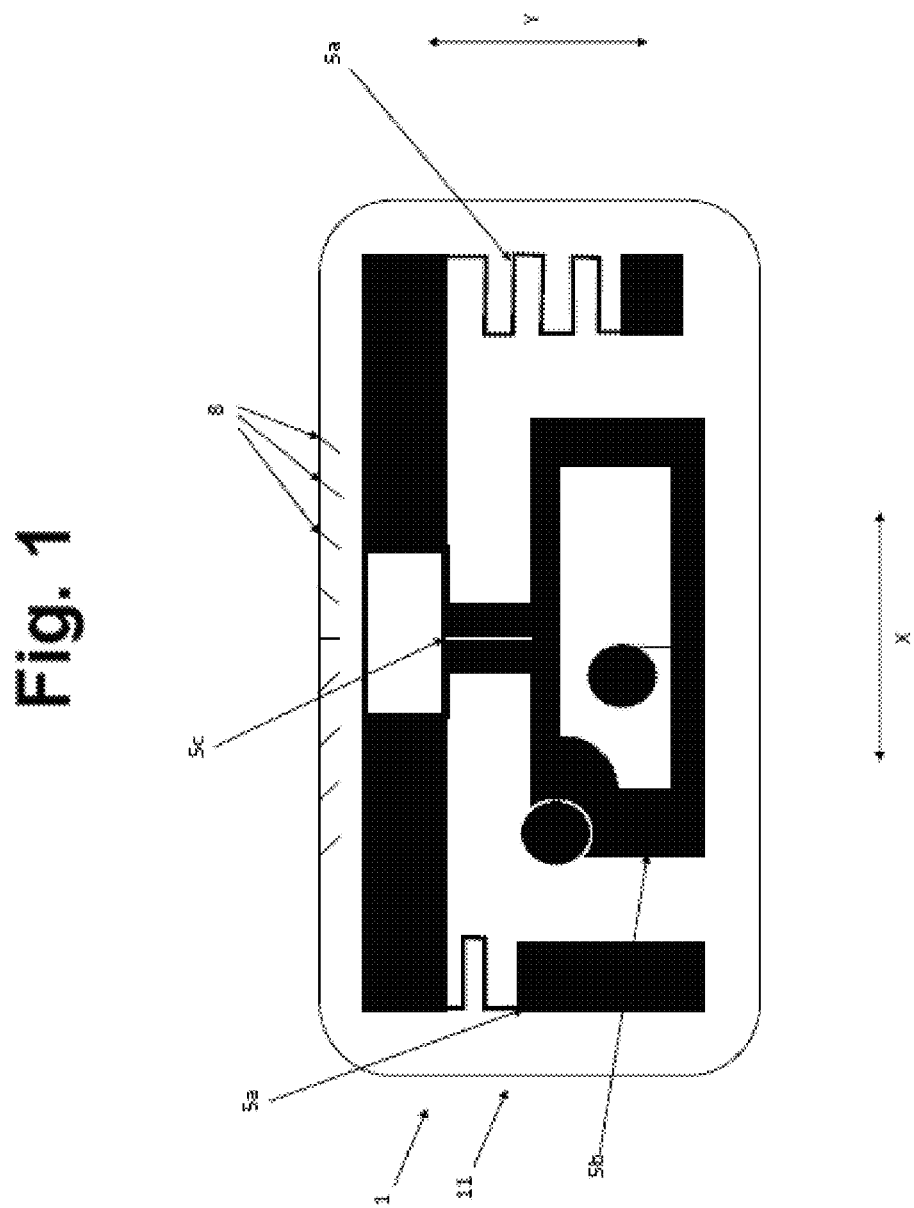
FIG. 1 shows a top view of a RFID label according to a first embodiment.
Figure 2:
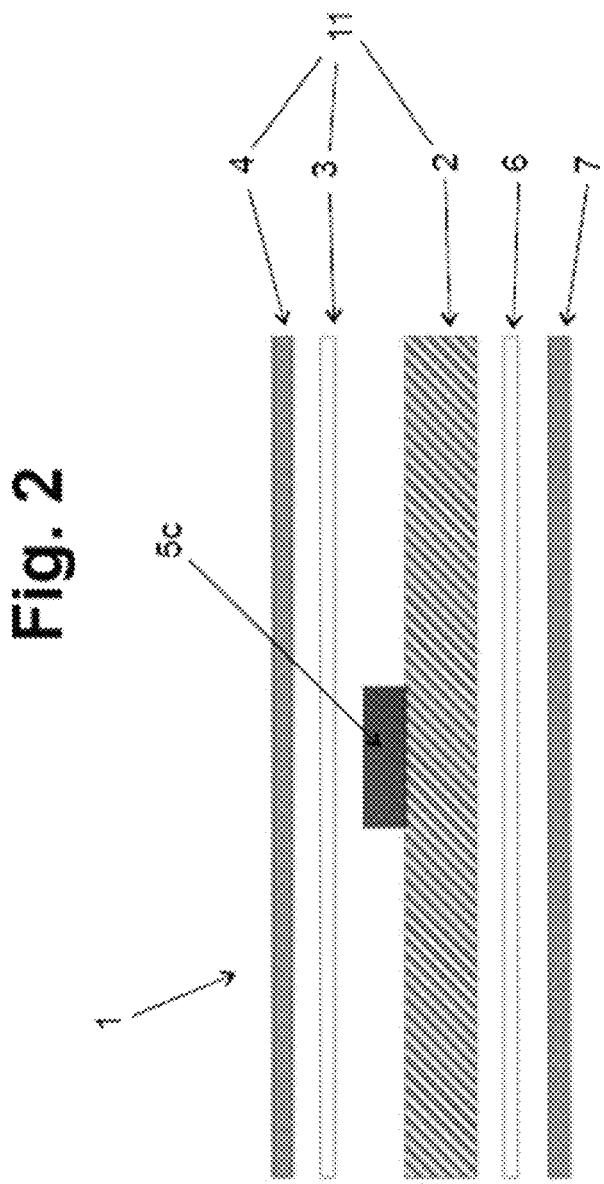
FIG. 2 shows a schematic cross section of the RFID label of FIG. 1.
Figure 3:
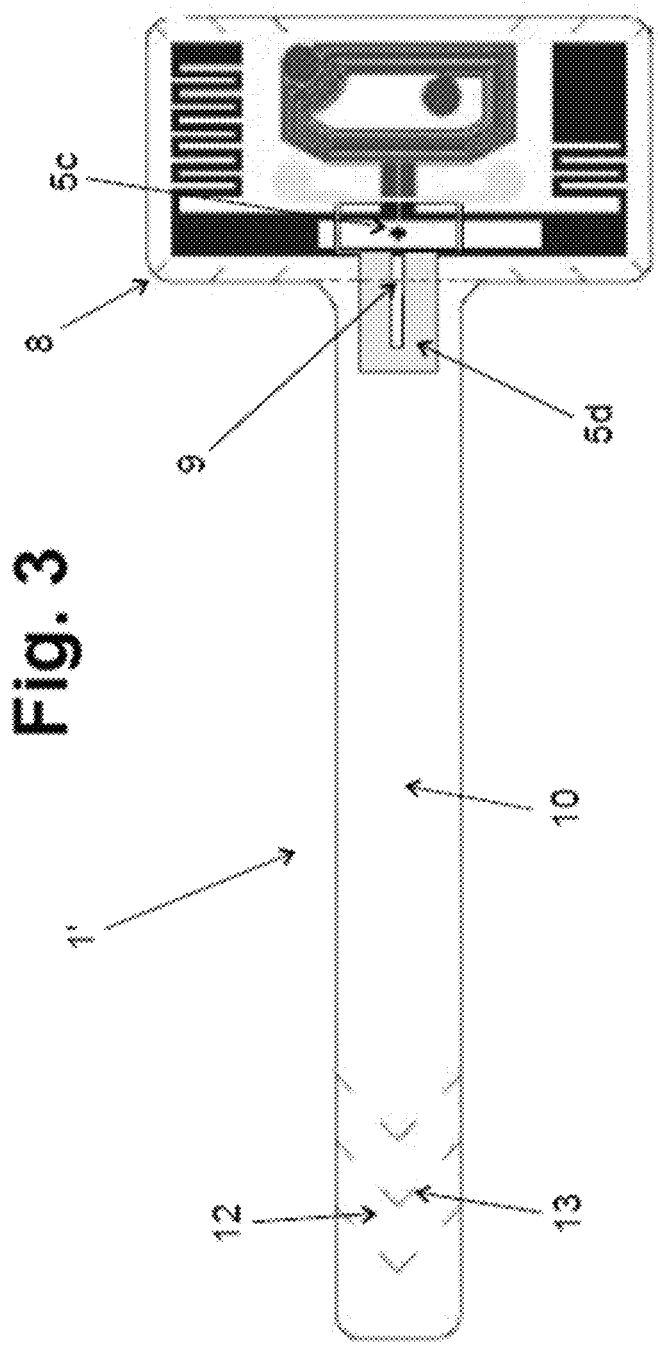
FIG. 3 shows a top view of a RFID label according to a second embodiment.

The RFID label 1, 1' of the invention as shown in FIGS. 1 to 3 generally includes a flat flexible support material base 11, at least one RFID microelectronic device 5c included in the flat support material base, and at least one antenna 5a, 5b connected with the at least one RFID microelectronic device 5c and included in the flat support material base 11.

The flat support material base 11 is substantially rectangular in a top view and is formed from a plastic or paper-based material on a surface of which the functional circuitry including the antenna and, preferably, a conductive loop 5*d* for tamper protection described later is/are printed or is formed from a metal layer 2, preferably an aluminium sheet which is cut or etched to form the functional circuitry and is laminated with or completely sealed within a protective layer (not shown).

The RFID chip (for example the chip EM4423T IC from EM MICROELECTRONIC-MARIN SA) is preferably an integrated circuit component 5*c* including the necessary RFID functionality and it is arranged on the surface of the metal layer 2 or printed plastic or paper-based material and has the respective terminals connected with the external circuitry (antenna(s), conductive loop).

The flat support material base 11 further has a PP (polypropylene) synthetic top surface layer 4 laminated on the printed plastic or paper-based material or the metal layer 2. The PP synthetic top surface layer 4 provides a temporary chemical resistance for different chemicals and acids (e.g. acetone, acetonitrile, isopropanol, methanol and 30% hydrochloric acid) typically encountered in the laboratory environment and it protects the RFID microelectronic device 5*c* and the external circuitry 5*a*, 5*b*, 5*d*. The PP synthetic top surface layer 4 may be adhered to the plastic or paper-based material or the metal layer 2 by an acrylic adhesive layer 3. A similar PP synthetic bottom surface layer (not shown) may be provided as needed Preferably the flat support material base 11 has, on its bottom surface, an adhesive bottom layer 6 or an adhesive applied to the bottom surface. The adhesive bottom layer 6 may be made from an acrylic adhesive and is covered by a release liner 7 that is to be removed (peeled off) prior to the application of the label to the desired surface.

The RFID microelectronic device 5*c* included in the support material base 11 (for example the above-mentioned chip EM4423T IC) is configured to communicate with external devices via two different frequency ranges, i.e. UHF and NFC, and thus has two different antennas 5*a*, 5*b* connected with the RFID microelectronic device and included in the flat support material base 11, too. The frequency of the NFC Band is 13.55-13.58 MHz. The frequency ranges in the UHF spectrum may be chosen to suit the respective geographical regions in which the label is to be used.

Figure 4:
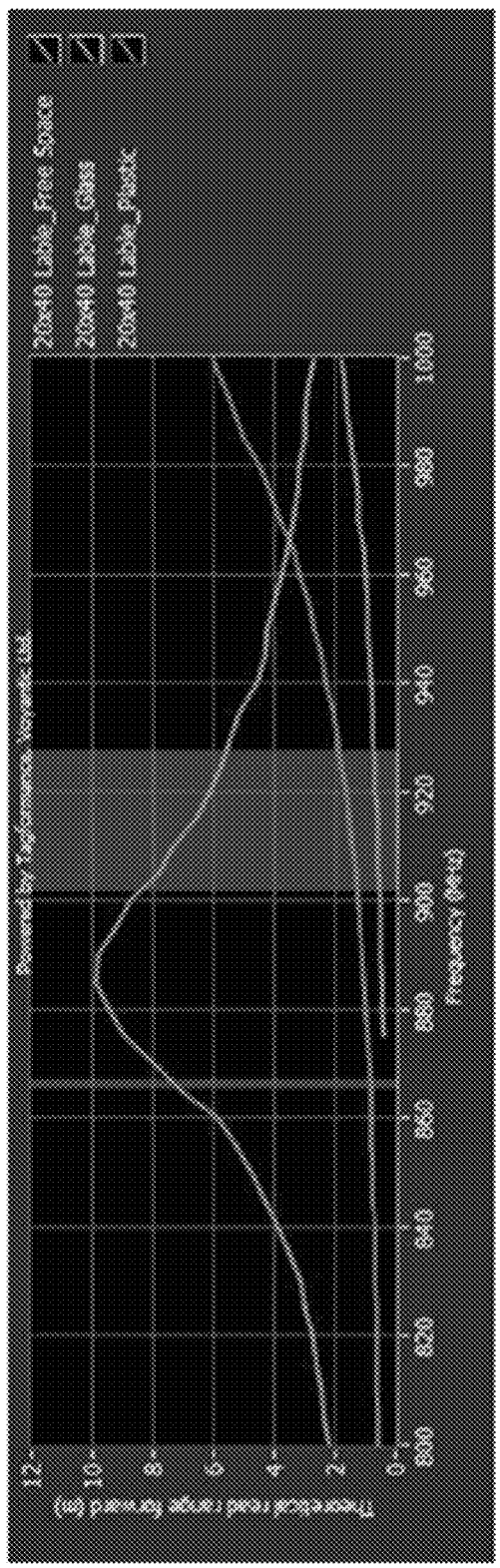
FIG. 4 shows the performance or reach for different UHF frequencies when the label according to the first embodiment is placed on bottles of different materials.
Figure 5:
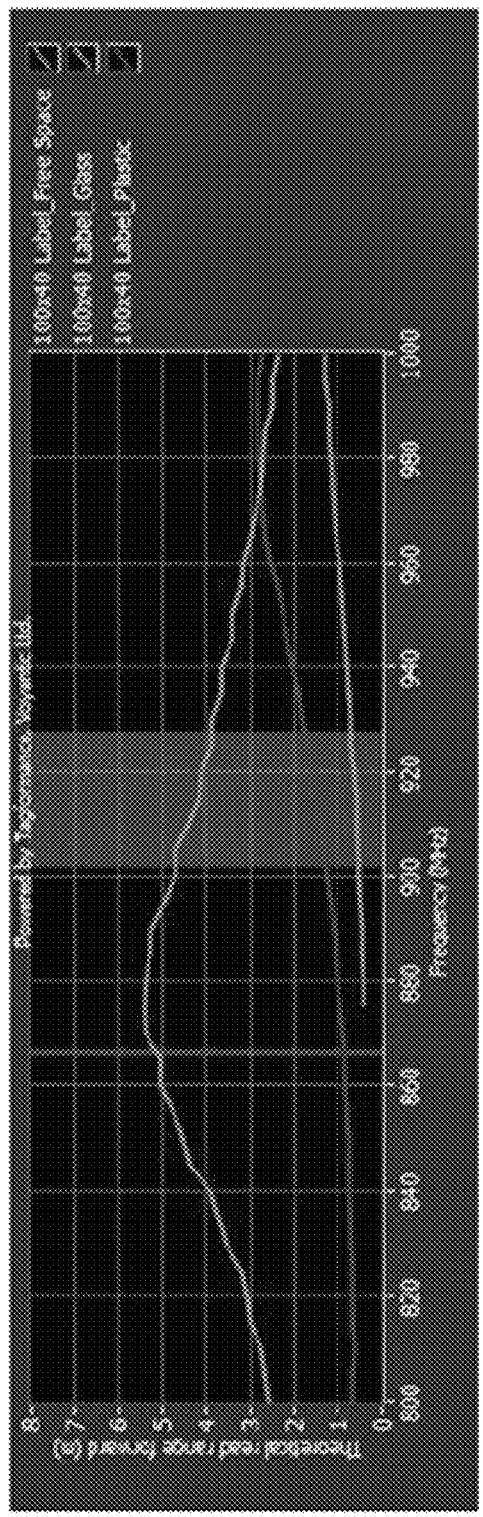
FIG. 5 shows the performance or reach for different UHF frequencies when the label according to the second embodiment is placed on bottles of different materials.

FIGS. 4 and 5 show the performance or reach for different UHF frequencies when the label according to the first embodiment or second embodiment is respectively placed on bottles of different materials. When the label 1, 1' is placed, for example, on a glass bottle, UHF performance or range is 4.8 m in EU band (865-868 Mhz) and 4.7-3.7 m in US band (902-928 MHz).

As shown in FIGS. 1 and 3 the two antennas 5*a*, 5*b* for HF and UHF are arranged on the metal layer 2 or the printed plastic or paper-based material such that one of the antennas (i.e. the HF or NFC antenna 5*b* is arranged between sections of the other antenna (i.e. the UHF antenna 5*a* in two configurations for different frequency bands) or is nested within the other antenna to reduce the space required for accommodating the antennas and thus limit the required size for the label despite of the expanded communication functionality.

A tamper detection function of the RFID label is realized in different ways. In both embodiments the flat support material base 11 has a number of predefined cuts 8 distributed about its outer periphery. The cuts 8 are substantially straight cuts or incisions through or substantially through the thickness of the support material base 11, preferably the PP synthetic top surface layer 4 but not through the metal layer 2 or the printed circuitry. The cuts must not necessarily reach through the entire material thickness but can be limited to a weakening to an extent that pulling on the label opens the cut without the possibility to re-arrange the label.

The cuts 8 are oriented so as to be inclined with respect to an outer edge of the flat support material base in a top view. The cuts 8 are preferably oriented substantially towards a central portion of the flat support material base in the top view, not necessarily a single point but a larger area, but they may be oriented radially from one or more point(s), too. Thus, some of the cuts in the center of the longitudinal extension of the edges may have an angle of about 90° to the edge contour whereas the other cuts are inclined with an angle different from 90°.

The cuts serve as security cuts that would easily break or open in case someone tries to pull off the label after the same is adhered to the surface of the respective container or piece of equipment.

The cuts 8 extend over a length between 3% and 10% of the length of the outer edge of the flat support material base 11 at which they are provided or in the direction of which they extend (X- or Y-direction in FIG. 1). Further, the cuts 8 are spaced from each other along the longitudinal direction of the outer edge by a length between 5% and 30% of the length of the outer edge of the flat support material base at which they are provided or in the direction of which they extend. For example, if the flat support material base has a rectangular outline as shown in FIGS. 1 and 3 with typical dimensions of 20 mm×40 mm, the depth of the cuts into the label, i.e. the length in the top view, is preferably 1.5 mm and the spacing along the outer edge contour is 5 mm.

The distribution of the cuts around the periphery not only provides the safety function against tampering or removal but also imparts a certain additional flexibility to the label to accommodate different curvatures along the directions of extension of the surface to which it is to be attached and to improve long-time adherence of the label.

In the preferred embodiment of the label 1' shown in FIG. 3 the flat flexible support material base 11 includes an elongated flexible extension strip 10 integrally formed with the support material base 11 so as to extend from an edge in a certain direction. The strip 10 is configured so that it can be at least partly (or fully) separated from the support material base 11 at a predefined separation structure 9 on application of a certain pulling force. The separation structure 9 is preferably in the form of a predefined tearing line formed by a number of spaced apart and aligned predefined incisions in the material. The strip 10, in particular its width and length, is dimensioned such that it can be routed over a spout or opening or lid/plug of a container while the label is attached to a peripheral surface of the container. The strip may contain, at its distal end portion, an adhesive section 12 that may be additionally provided with a defined tearing portion 13 preventing peeling off of the adhesive section 12 without destruction of the strip in this zone. Plural strips 10 may be provided at different sides of the support material base 11.

The separation structure 9, preferably in the form of the tearing line, is preferably unsymmetrical to define a preferred start of tearing at one side and to eventually stop the tearing at the other side to avoid complete separation of the strip 10.

In the preferred embodiment of the label 1' shown in FIG. 3 the at least one RFID microelectronic device 5*c* includes a tamper detection function and the label includes an associated conductive loop or pattern 5d printed on the plastic or paper-based material or included in the metal layer 2 and conductively connected with tamper detection function terminals of the RFID microelectronic device 5c so as to be included in the flat support material base 11. If one tries to remove the label from the container, the conductive loop 5d is torn and the interruption can be detected by the RFID microelectronic device 5c and communicated to the outside upon interrogation as an indication of the seal breaking. This function is particularly useful if, as in the embodiment of FIG. 3, the conductive loop 5d extends over the predefined separation structure 9 (tearing line) because its interruption is indicative of a potential opening of the container after removal of the strip 10.

The conductive loop may also be routed through other relevant parts of the label. In addition, a separate conductive loop may be provided in the label to protect, for example, the tampering of the RFID microelectronic device 5c. In addition, the conductive loop can be arranged on the same side surface as the antenna(s) or may be led and arranged to a backside of the antenna layer 2 to have a better protection against external impacts and increased flexibility of arrangement without conflict with the antenna(s) (see FIG. 3). As shown in FIG. 3 the conductive loop is arranged towards the side of the UHF antenna to reduce the electric currents over the conductive loop area in combination with the NFC antenna.

The safety feature of the cuts 8 distributed around the periphery of the label and the safety feature of the conductive loop 5d may be combined in the same label as shown in FIG. 3 or may be applied independently (as shown in FIG. 1 as far as the cuts are concerned).

The invention claimed is:

1. A RFID label (1) for marking containers or equipment by adhering the RFID layer to a surface thereof, the label (1) comprising
a flat flexible support material base (11),
at least one RFID microelectronic device (5c) included in the flat support material base (11), and
at least one antenna (5a,5b) connected with the at least one RFID microelectronic device (5c) and included in the flat support material base (11),
wherein the flat support material base (11) has a number of predefined cuts (8) distributed about its outer periphery, which are substantially straight cuts (8) that are oriented so as to be inclined with respect to an outer edge of the flat support material base (11) in a top view and
wherein the at least one RFID microelectronic device (5c) includes a tamper detection function and a conductive loop (5d) connected with tamper detection function terminals of the RFID microelectronic device (5c) is included in the flat support material base (11).

2. The RFID label (1) according to claim 1, wherein the flat flexible support material base (11) includes an elongated extension strip (10) integrally formed with the support material base (11) so as to extend therefrom and configured to be at least partly separated from the support material base (11) at a predefined separation structure (9).

3. The RFID label (1) according to claim 2,
wherein the conductive loop (5d) extends over the predefined separation structure (9).

4. The RFID label (1) according to claim 1, wherein the cuts (8) are oriented substantially towards a central portion of the flat support material base (11) in the top view.

5. The RFID label (1) according to claim 1, wherein the cuts (8) extend over a length between 3% and 10% of the length of an outer edge of the flat support material base (11) at which they are provided or in the direction of which they extend.

6. The RFID label (1) according to claim 1, wherein the cuts (8) are spaced from each other along the outer edge by a length between 5% and 30% of the length of the outer edge of the flat support material base (11) at which they are provided or in the direction of which they extend.

7. The RFID label (1) according to claim 1, wherein the flat support material base (11) is substantially rectangular in a top view.

8. The RFID label (1) according to claim 1, wherein the antenna (5a,5b) and the conductive loop (5d) are printed on a surface of a plastic or paper-based material or are formed from a metal layer (2).

9. The RFID label (1) according to claim 8, wherein the flat support material base (11) has a PP synthetic top surface layer (4) laminated on the printed plastic or paper-based material or the metal layer (2).

10. The RFID label (1) according to claim 1, wherein the flat support material base (11) has an adhesive bottom layer (6) applied to the bottom surface.

11. The RFID label (1) according to claim 1, wherein the RFID microelectronic device (5c) is configured to communicate with two different frequency ranges, and a second antenna (5a, 5b) connected with the RFID microelectronic device (5c) is included in the flat support material base (11).

12. The RFID label (1) according to claim 11,
wherein one of the antennas (5a,5b) is arranged between sections of the other antenna (5a,5b) or is nested within the other antenna (5a,5b).

13. The RFID label (1) according to claim 2, wherein the flat flexible support material base (11) includes an elongated extension strip (10) integrally formed with the support material base (11) so as to extend therefrom and configured to be at least partly separated from the support material base (11) at a predefined separation structure (9) in the form of a predefined tearing line.

14. The RFID label (1) according to claim 13,
wherein the conductive loop (5d) extends over the predefined separation structure (9) in the form of the tearing line, which tearing line is unsymmetrical to define a preferred start of tearing.

15. He RFID label (1) according to claim 1, wherein the RFID microelectronic device (5c) is configured to communicate with two different frequency ranges of UHF and NFC, and a second antenna (5a,5b) connected with the RFID microelectronic device (5c) is included in the flat support material base (11).

16. A container, cylindrical bottle, vial or syringe, comprising an RFID label (1) on a surface thereof, which RFID label (1) is for marking containers or equipment by adhering the RFID layer to a surface thereof, the label (1) comprising
a flat flexible support material base (11),
at least one RFID microelectronic device (5c) included in the flat support material base (11), and
at least one antenna (5a,5b) connected with the at least one RFID microelectronic device (5c) and included in the flat support material base (11),
wherein the flat support material base (11) has a number of predefined cuts (8) distributed about its outer periphery, which are substantially straight cuts (8) that are oriented so as to be inclined with respect to an outer edge of the flat support material base (11) in a top view and
wherein the at least one RFID microelectronic device (5c) includes a tamper detection function and a conductive loop (5*d*) connected with tamper detection function terminals of the RFID microelectronic device (5*c*) is included in the flat support material base (11).

\* \* \* \* \*